United States Patent [15] 3,706,459
Frenzel et al. [45] Dec. 19, 1972

[54] OIL SEAL FOR ROTARY PISTON MACHINES

[72] Inventors: Manfred Frenzel; Karl Vom Stein, both of Burscheid, Germany

[73] Assignee: Goetzewerke Friedrich Goetze A.G., Burscheid, Germany

[22] Filed: Dec. 30, 1970

[21] Appl. No.: 102,605

[30] Foreign Application Priority Data

April 29, 1970 Germany .................. G 70 16 069.9

[52] U.S. Cl. .................................................. 277/40
[51] Int. Cl. ........................... F16j 9/00, F16j 15/40
[58] Field of Search ..................... 277/40, 86, 39, 41

[56] References Cited

UNITED STATES PATENTS 3,319,968   5/1967   Yost ..................................... 277/40

Primary Examiner—Milton Kaufman
Assistant Examiner—Frank Susko
Attorney—Spencer & Kaye

[57] ABSTRACT

A sliding ring oil seal has its sliding ring held by a support ring. Lugs protrude radially from the support ring to interfere with the seal housing and prevent relative rotation between the sliding ring and the seal housing.

10 Claims, 3 Drawing Figures

Inventors
Manfred Frenzel
Karl vom Stein

By *Spencer & Kaye*
Attorneys.

Inventors
**Manfred Frenzel
Karl vom Stein**

By *Spencer & Kaye*
Attorneys.

OIL SEAL FOR ROTARY PISTON MACHINES

BACKGROUND OF THE INVENTION

The present invention relates to an oil seal for rotary piston machines. More particularly, the present invention relates to the type of oil seal represented by parts 16, 16a and 17 in U.S. Pat. No. 3,249,094, issued to E. Höppner et al May 3, 1966, for a "Lubricating Sealing Means for Rotary Combustion Engines" for sealing between a rotary piston, such as rotor 8 of such patent, and a shaft-fixed disc, such as discs 14 and 15 of such patent.

In the present state of the art, such seals generally are made up of an annular housing which is U-shaped in planes radiating from the axis of the housing, a sliding ring mounted in the housing in such a manner that no relative rotation between housing and sliding ring is possible, and an O-ring situated for static sealing between the sliding ring and the housing, and a spring between the housing and the sliding ring for urging the sliding ring into wiping sealing contact with either the shaft-fixed disc or the rotary piston.

The O-ring may be situated between the sliding ring and either the radially inner or the radially outer U-leg, and it may be seated in a groove of the sliding ring or simply rest between sliding ring and housing.

A variety of spring types are used to bias the sliding ring toward the surface on which it is to wipe. Examples are coil springs and wave spring washers, which act between the back-side of the sliding ring or a radial flange of the sliding ring and the rear of the housing.

When sliding rings of carbon, molded material based on synthetic resins, or ceramic are used, it is known to place a metal support ring between the spring and the sliding ring to provide a uniform loading of the relatively brittle sliding ring.

The locking of the sliding ring to the seal housing, so that no relative rotation between them can occur, is done in known seals by providing reciprocally interfering profiling of the inner periphery of the seal housing and the outer periphery of the sliding ring. When using sliding ring materials of low shear strengths, it is necessary to provide extra axial length for housing and sliding ring, in order that the shear stress level be kept low.

The large axial lengths of known structures has presented special difficulties in sealing situations of the above-referenced type between a shaft-fixed disc and a rotary piston. Moreover, there is generally some radial movement of the surface against which the sliding ring wipes in such sealing situations, rather than in entirely circular movement, and the resulting additional loading must be brought into consideration.

SUMMARY OF THE INVENTION

An object of the present invention is to provide a new and improved seal.

Another object of the present invention is to provide a new and improved seal especially suited for emplacement between a rotary piston and a shaft-fixed disc as above referenced.

Yet another object of the present invention is to provide a seal having a structure inherently permitting reduced axial lengths of sliding ring and housing even though the sliding ring is made of a material of low shear strength.

These as well as other objects which will become apparent in the discussion that follows are achieved, according to the present invention, by a sliding-ring seal having a sliding ring situated in an annular housing of U-shape in planes radiating from the axis of the housing, with an axially operating spring seated in the housing, the spring having a relatively small axial dimension, and with a support ring provided on the back of the sliding ring, the support ring having an angular cross section including an axially extending leg bearing against the inner or outer periphery of the sliding ring, on the free end of which leg there protrude radially inwardly or outwardly directed lugs which extend into mating recesses in the adjacent housing U-leg.

DESCRIPTION OF THE PREFERRED EMBODIMENTS

Figure 1:
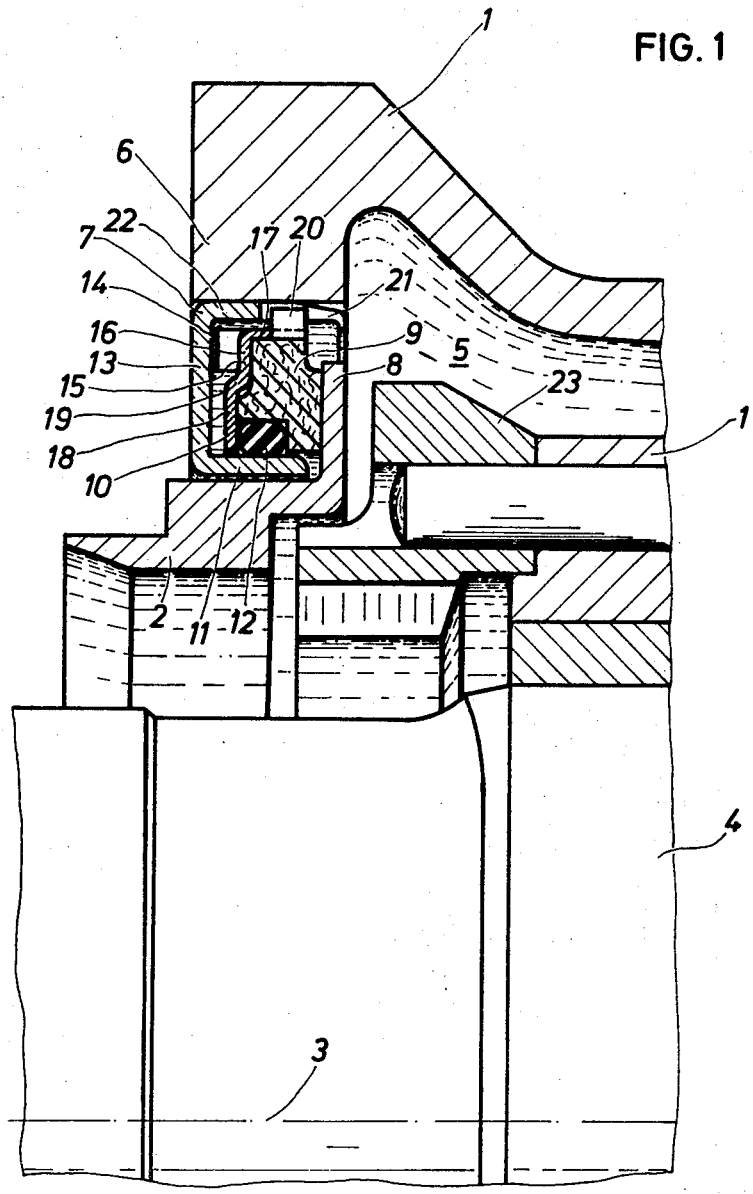
FIG. 1 is a cross section, with parts broken away, of a rotary piston machine containing the oil seal of the invention; the plane of the figure contains the shaft axis and the eccentric axis.
Figure 2:
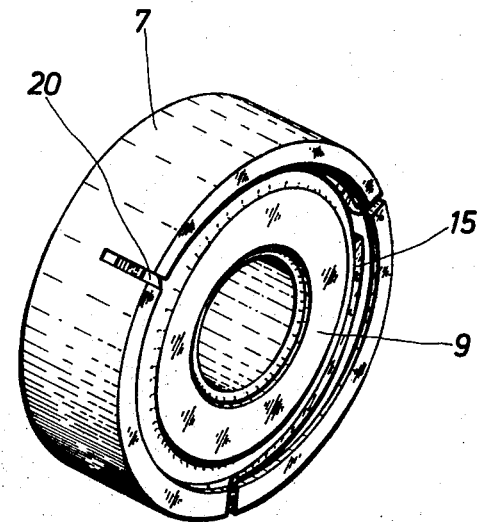
FIG. 2 is an isometric assembly view of the oil seal of FIG. 1.
Figure 3:
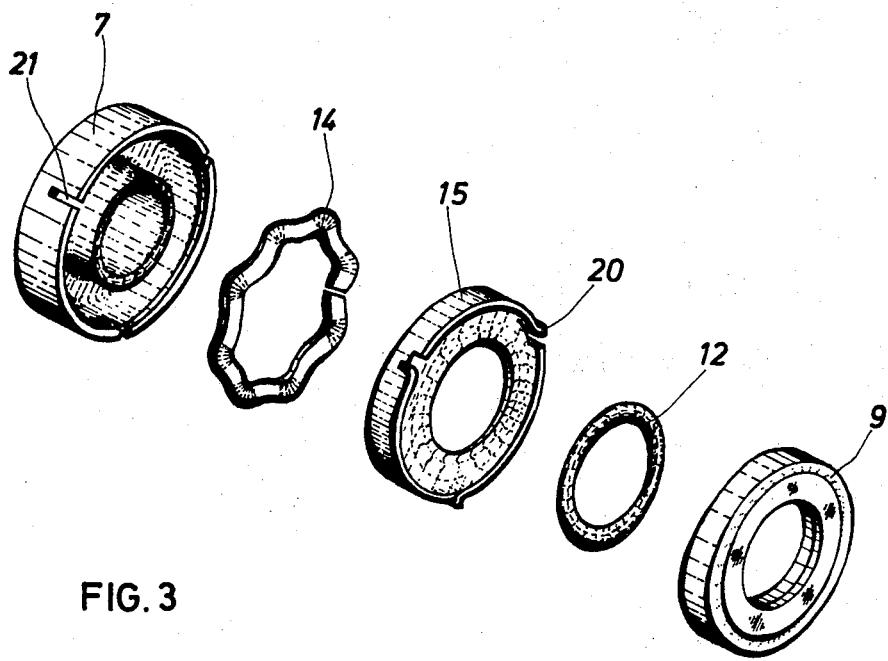
FIG. 3 is an isometric exploded view of the oil seal of FIG. 1.

Preferably, the sliding ring and the support ring of the present invention are reciprocally formed so that there is a secure clutching of the sliding ring by the support ring. The resulting support means small axial dimensions for the sliding ring, even though it is made of a relatively brittle material.

In a preferred embodiment, the support ring has the above-mentioned leg on its radially outward edge and this leg thus is able to oppose the centrifugal forces arising in the material of the sliding ring during rotation of the oil seal. Thus a fracturing of the sliding ring at high oil seal r.p.m. is prevented.

The axial size of the seal of the present invention is held to a minimum by the preventing of relative rotation between the sliding ring and the seal housing by the indirect route of creating a secure clutching of the sliding ring by the support ring and by then creating mechanical interference between the support ring and the seal housing.

According to a further development of the present invention, the radially extending portion of the support ring has a stepped cross section. This step centers the spring situated between the seal housing and the support ring, the spring being situated between the base of the housing U and that part of the radially extending portion farthest from the U-base. Such is important to prevent a radial collapse of the spring arising from centripetal forces due to the revolution of the seal about the shaft axis when the seal is centered on the eccentric axis as in U.S. Pat. No. 3,249,094. The step likewise allows the space not needed for the spring (deducting, of course, a certain amount of space needed for axial movement of the support ring and sliding ring under spring bias) to be used for the static sealing between the sliding ring and the seal housing. Additionally, the step acts to stiffen the support ring.

In a further development of this embodiment, the axial step height is equal to the maximum compressive travel allowed for the spring In this development, just before plastic deformation is going to be experienced in the spring, the portion of the support ring not in contact with the spring comes into contact with the U-base or back-side of the housing and prevents further compression of the spring.

Besides relying on friction to lock the sliding ring to the housing, a further development of the present invention incorporates a bond, such as a bond of an epoxide cement or a brazing alloy, between the sliding ring and the supporting ring.

Referring now to the drawing, only so much of a rotary piston machine as will suffice to show the connection of the oil seal of the present invention to such a machine is shown. For more details concerning a similar type of rotary piston machine in which the oil seal of the present invention could be installed, reference is made to U.S. Pat. No. 3,249,094, issued to E. Höppner et al May 3, 1966, for "Lubricating Sealing Means for Rotary Combustion Engines."

Piston 1 is rotatably mounted on an eccentric of an eccentric-carrying shaft 4. Shaft 4 rotates about axis 3, while the piston rotates about an axis eccentric to axis 3. Revolving disc 2 is fixed securely for positive rotation with shaft 4 and is concentric with the eccentric axis about which piston 1 rotates.

The oil seal of the present invention is press-fitted against the inner diameter of piston section 6 and serves to seal the oil chamber in piston interior 5. The seal itself includes an annular metal housing 7 having a U-shape in planes radiating from its axis. All of the axes of the parts of the seal are coincident with the eccentric axis about which piston 1 rotates. Situated within housing 7 is a sliding ring 9, which wipes against radial flange 8 of disc 2.

The sliding ring 9 is provided with an inner recess 10 to receive an 0-ring 12. This O-ring provides a static sealing between the inner axially extending leg 11 of the housing 7 and the sliding ring 9.

Annular wave spring 14 presses away from the base 13 of the housing U axially toward the sliding ring 9 to bias it into contact with flange 8. Spring 14 has an axially extending slot at a location on its periphery. Interposed between the spring 14 and the sliding ring 9 is support ring 15, which contacts the back-side of the sliding ring with its radially extending portion made up of parts 16 and 18. Axially extending leg 17 of the support ring extends into the space between outer axial U-leg 22 and the sliding ring 9 and bears against the periphery of the sliding ring. A bond material is interposed between the leg 17 and the sliding ring 9 to provide a torque-transmitting locking of the leg 17 to ring 9.

The inner radially extending part 18 of support ring 15 is joined to the outer radially extending part 16 by step 19. Part 18, which is closest to U-base 13, serves to bound O-ring 12 in the recess 10 of the sliding ring 9, while step 19 centers spring 14 in position between part 16, farthest from U-base 13, and housing 7.

The leg 17 has lugs 20 bent to extend radially outwards from the seal axis. These lugs fit into axially extending slots 21 in the outer U-leg 22. There is thus achieved a locking of the sliding ring to the housing whereby no relative rotation between them is possible. Nevertheless, the sliding ring is free to be biased by spring 14 toward flange 8, since lugs 20 can slide in slots 21. The reliance on bond material for the locking of sliding ring 9 to support ring 15 can be replaced partially or completely by a press fitting of the sliding ring 9 into the support ring 15, depending on the particular strength characteristics of the material of the sliding ring. The use of bond material is, however, preferred for brittle materials.

Due to the presence of the O-ring 12, the sliding ring 9 is elastically supported on the inner U-leg 11. At the same time, support ring 15 limits the movement of the sliding ring 9 radially against the elastic bias of O-ring 12 and thus acts to center the sliding ring relative to the housing 7. Consequently, the relative movement between sliding ring 9 and flange 8 is substantially circular. The oil seal, which is secured to piston 1 and centered on the axis of rotation of piston 1, additionally executes a revolution about the axis 3 of shaft 4.

Member 23 is an internally toothed gear secured to piston 1; member 23 corresponds to gear 11 in U.S. Pat. No. 3,249,094.

It will be understood that the above description of the present invention is susceptible to various modifications, changes and adaptations, and the same are intended to be comprehended within the meaning and range of equivalents of the appended claims.

We claim:

1. A seal suitable for sealing a gap between a revolving shaft-fixed disc and a side of a rotary piston of a rotary piston machine, the piston moving substantially only circularly relative to the disc, comprising: an annular housing having a U-shaped cross section in planes radiating from the axis of the housing, the legs of the U being substantially parallel to said axis; a sliding ring of brittle material situated in said housing; means for sealing a gap between said sliding ring and one of the U-legs; a support ring of a material having a shear strength higher than that of said sliding ring having a portion interposed between the sliding ring and the base of the U and in contact with the sliding ring; and spring means for biasing said support ring away from the base of the U; said sliding ring being secured against relative movement with said supporting ring; said support ring having a leg extending into a space between one of the U-legs and said sliding ring substantially in parallel with the U-legs; the support ring leg bearing against the periphery of said sliding ring and having lugs extending radially toward the U-leg bordering said space; the U-leg bordering said space being radially recessed at positions for mating with said lugs.

2. A seal as claimed in claim 1, the portion of said support ring interposed between the sliding ring and the base of the U having a step.

3. A seal as claimed in claim 1, further comprising bonding material interposed between said leg of the support ring and the periphery of the sliding ring.

4. A seal as claimed in claim 1, wherein the radially outward U-leg is the U-leg bordering said space.

5. A seal as claimed in claim 4, said means for sealing being situated between said sliding ring and the radially inward U-leg.

6. A seal as claimed in claim 4, wherein the axial height of said step is equal to the maximum compressive travel of said spring means.

7. A seal suitable for sealing a gap between a revolving shaft-fixed disc and a side of a rotary piston of a rotary piston machine, the piston moving substantially only circularly relative to the disc, comprising: an annular housing having a U-shaped cross section in planes radiating from the axis of the housing, the legs of the U being substantially parallel to said axis; a sliding ring situated in said housing; means for sealing a gap between said sliding ring and one of the U-legs; a support ring having a portion interposed between the sliding ring and the base of the U and in contact with the sliding ring; and spring means for biasing said support ring away from the base of the U; said portion of said support ring, interposed between said sliding ring and said base of the U having a step arranged such that the radially inward part of said portion is closest to said base of the U, with said spring means arranged radially outwards from said step and with said means for sealing arranged radially inwards from said step; said support ring having a leg extending into a space between one of the U-legs and said sliding ring substantially in parallel with the U-legs; the support ring leg bearing against the periphery of said sliding ring and having lugs extending radially toward the U-leg bordering said space; the U-leg bordering said space being radially recessed at positions for mating with said lugs.

8. A seal suitable for sealing a gap between a revolving shaft-fixed disc and a side of a rotary piston of a rotary piston machine, the piston moving substantially only circularly relative to the disc, comprising: an annular housing having a U-shaped cross section in planes radiating from the axis of the housing, the legs of the U being substantially parallel to said axis; a sliding ring situated in said housing; means for sealing a gap between said sliding ring and one of the U-legs; a support ring having a portion including a step interposed between the sliding ring and the base of the U and in contact with the sliding ring; and spring means for biasing said support ring away from the base of the U; said spring means being located between a part of said portion farthest from said base of the U and said base with the axial height of said step being equal to the maximum compressive travel of said spring means, said support ring having a leg extending into a space between one of the U-legs and said sliding ring substantially in parallel with the U-legs; the support ring leg bearing against the periphery of said sliding ring and having lugs extending radially toward the U-leg bordering said space; the U-leg bordering said space being radially recessed at positions for mating with said lugs.

9. A seal suitable for sealing a gap between a revolving shaft-fixed disc and a side of a rotary piston of a rotary piston machine, the piston moving substantially only circularly relative to the disc, comprising: an annular housing having a U-shaped cross section in planes radiating from the axis of the housing, the legs of the U being substantially parallel to said axis; a sliding ring situated in said housing; means for sealing a gap between said sliding ring and the radially inward U-leg; a support ring having a portion interposed between the sliding ring and the base of the U and in contact with the sliding ring; and spring means for biasing said support ring away from the base of the U; said portion of said support ring interposed between said sliding ring and said base of the U having a step arranged such that the radially inward part of said portion is closest to said base of the U, with said spring means arranged radially outwards from said step and with said means for sealing arranged radially inwards from said step; said support ring having a leg extending into a space between the radially outward U-leg and said sliding ring substantially in parallel with the U-legs; the support ring leg bearing against the periphery of said sliding ring and having lugs extending radially toward said radially outward U-leg; said radially outward U-leg being radially recessed at positions for mating with said lugs.

10. A seal as claimed in claim 9, the radially inwards part of said portion bounding said means for sealing within a recess in said sliding ring.

* * * * *